(12) United States Patent
Senda et al.

(10) Patent No.: US 12,644,800 B2
(45) Date of Patent: Jun. 2, 2026

(54) GAS ANALYZER

(71) Applicant: SHIMADZU CORPORATION, Kyoto (JP)

(72) Inventors: Atsuko Senda, Kyoto (JP); Toshihisa Itabashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 241 days.

(21) Appl. No.: 18/279,295

(22) PCT Filed: Oct. 21, 2021

(86) PCT No.: PCT/JP2021/039007
§ 371 (c)(1),
(2) Date: Oct. 4, 2023

(87) PCT Pub. No.: WO2022/185604
PCT Pub. Date: Sep. 9, 2022

(65) Prior Publication Data
US 2024/0183761 A1 Jun. 6, 2024

(30) Foreign Application Priority Data

Mar. 4, 2021 (JP) .................................. 2021-034137

(51) Int. Cl.
G01N 1/22 (2006.01)
G01N 1/24 (2006.01)
(Continued)

(52) U.S. Cl.
CPC ............. G01N 1/2273 (2013.01); G01N 1/24 (2013.01); G01N 1/4005 (2013.01); G01N 1/42 (2013.01)

(58) Field of Classification Search
CPC ...... G01N 1/2273; G01N 1/24; G01N 1/4005; G01N 1/42; G01N 33/0016; G01N 1/2258; G01N 1/2252
(Continued)

(56) References Cited

U.S. PATENT DOCUMENTS 6,156,106 A 12/2000 Kamata
7,361,206 B1 * 4/2008 Jahn ..................... B01D 53/268
95/82
(Continued)

FOREIGN PATENT DOCUMENTS

CN 108982765 A * 12/2018 ......... G01N 33/0016
JP 11-19462 A 1/1999
(Continued)

OTHER PUBLICATIONS

Extended European Search Report issued Jul. 12, 2024 in European Application No. 21929165.5.
(Continued)

*Primary Examiner* — Robert R Raevis
(74) *Attorney, Agent, or Firm* — Sughrue Mion, PLLC

(57) ABSTRACT

A gas analyzer capable of facilitating the treatment of water generated from an analysis target gas and collected in a drain pot includes: an analysis target gas flow path through which an analysis target gas flows; a cooling unit provided in the analysis target gas flow path to cool the gas; a drain flow path through which liquid generated in the cooling unit is discharged; a closed container connected to the drain flow path; a selective permeation member which is a member partitioning the inside of the closed container into the drain introduction space connected to the drain flow path and a gas introduction space to selectively let gas-phase water permeate from the drain introduction space to the gas introduction space; a gas source to introduce a gas into the gas introduc-
(Continued)

tion space; and a gas discharge port through which a gas in the gas introduction space is discharged.

8 Claims, 2 Drawing Sheets

(51) Int. Cl.
    *G01N 1/40*         (2006.01)
    *G01N 1/42*         (2006.01)

(58) Field of Classification Search
    USPC ..... 73/19.1, 19.2, 23.2, 23.31, 31.01, 31.07,
        73/863.12, 863.21; 95/39, 52, 260;
        96/155, 181, 188
    See application file for complete search history.

(56) References Cited

U.S. PATENT DOCUMENTS 8,318,023 B2 * 11/2012 Mordukhovich ....... F16N 39/06
           95/52

8,337,590 B2 * 12/2012 Herencia ............. B01D 53/268
           95/52
2013/0275047 A1 * 10/2013 Selman ............. B01D 19/0052
           702/9

FOREIGN PATENT DOCUMENTS

| | | | |
|---|---|---|---|
| JP | 2005-195327 A | 7/2005 |
| JP | 2009-72701 A | 4/2009 |
| JP | 2017-213477 A | 12/2017 |

OTHER PUBLICATIONS

"SWT series", [online], AGC Engineering Co., Ltd., [searched on Jun. 12, 2020], Internet <URL:https://www.agec.co.jp/product/sunsep/swt.html>, 2 pages.
International Search Report for PCT/JP2021/039007 dated Dec. 21, 2021 [PCT/ISA/210].
Written Opinion for PCT/JP2021/039007 dated Dec. 21, 2021 [PCT/ISA/237].
Communication dated Mar. 26, 2026 in Chinese Application No. 202180095090.5.

* cited by examiner

GAS ANALYZER

CROSS REFERENCE TO RELATED APPLICATIONS

This application is a National Stage of International Application No. PCT/JP2021/039007 filed Oct. 21, 2021, claiming priority based on Japanese Patent Application No. 2021-034137 filed Mar. 4, 2021.

TECHNICAL FIELD

The present invention relates to a gas analyzer having a drain pot.

BACKGROUND ART

In facilities like thermal power plants and waste incineration plants, high-temperature exhaust gas generated by combustion is discharged. In order to confirm that the amount of a specific component contained in the exhaust gas does not exceed a criterion value prescribed by law, a gas analyzer is used in these facilities.

The exhaust gas generated in the facilities described above generally contains water vapor, and if such exhaust gas is introduced into the analyzer as it is, accurate measurement cannot be performed. Therefore, a cooler which cools the analysis target gas is provided in the gas flow path connecting a sampling point of the exhaust gas and the analyzer. When the exhaust gas is cooled in this manner, water vapor is liquefied in the cooler, and the water vapor is removed from the analysis target gas. The liquefied water (drain water) is introduced into a drain pot through a drain flow path (drain pipe) (for example, Patent Literature 1).

An overflow drain pot is a water storage container having a side surface provided with a drain port which is always open to the atmosphere, and a distal end of a drain flow path extending from the cooler is disposed below the drain port in the water storage container. In the overflow drain pot, water is always stored above the distal end of the drain flow path, and thus external gas is prevented from flowing into the gas flow path through the drain pot, the drain flow path, and the cooler. When the amount of water in the drain pot increases due to inflow of water from the cooler, the water pours out of the drain pot from the drain port.

A closed drain pot is a water storage container provided with a drain port having an on-off valve, and the distal end of the drain flow path extending from the cooler is inserted into the water storage container. The drain port may be disposed on a side wall or on a bottom of the water storage container, and the height of the distal end of the drain flow path does not depend on a height of the drain port. In the closed drain pot, the water storage container is usually closed by closing the on-off valve, which prevents external gas from flowing into the gas flow path. Since the amount of water in the drain pot increases as the water flows in from the cooler, an operator of the facility periodically stops an operation of the gas analyzer and then opens the on-off valve to discharge the water from the drain port to the outside of the drain pot.

CITATION LIST

Patent Literature

Patent Literature 1: JP 2005-195327 A
Patent Literature 2: JP 2017-213477 A

Non Patent Literature

Non Patent Literature 1: "SWT series", [online], AGC Engineering Co., Ltd., [searched on Jun. 12, 2020], Internet

SUMMARY OF INVENTION

Technical Problem

Water generated in a cooler becomes nitric acid or sulfuric acid when nitrogen oxides or sulfur oxides contained in an exhaust gas are dissolved in the water. Such water cannot be discharged outside unless appropriate treatment is performed, but in a conventional drain pot, water containing nitric acid or sulfuric acid generated in the cooler is discharged as it is.

An object of the present invention is to provide a gas analyzer capable of facilitating the treatment of water generated from an analysis target gas and collected in a drain pot.

Solution to Problem

A gas analyzer according to the present invention made to solve the above problems includes:

an analysis target gas flow path through which an analysis target gas flows;

a cooling unit which is provided in the analysis target gas flow path and configured to cool the analysis target gas;

a drain flow path through which liquid generated in the cooling unit is discharged;

a closed container connected to the drain flow path;

a selective permeation member which is a member partitioning the inside of the closed container into a drain introduction space connected to the drain flow path and a gas introduction space and configured to selectively let gas-phase water permeate from the drain introduction space to the gas introduction space;

a gas source configured to introduce a gas into the gas introduction space; and a gas discharge port through which the gas in the gas introduction space is discharged.

Advantageous Effects of Invention

In the present invention, the inside of a closed container (closed drain pot) is divided into a drain introduction space connected to a drain flow path and a gas introduction space into which a gas is introduced by a gas source by a selective permeation member configured to selectively let gas-phase water permeate. When a gas (different from the analysis target gas) is introduced into the gas introduction space by a gas source, only water out of water containing nitric acid or sulfuric acid generated in a cooling unit and introduced into the drain introduction space of the closed container from a drain flow path permeates through the selective permeation member and enters the gas introduction space. The water that has entered the gas introduction space is taken into the gas and discharged to the outside from a gas discharge port. At that time, since the gas neither contains nitric acid nor sulfuric acid, there is no problem even if the gas is released into the environment without any treatment.

As described above, water is discharged from the closed container, and nitric acid and sulfuric acid are concentrated and stored in the drain introduction space of the closed container. Note that nitric acid and sulfuric acid in the drain introduction space need to be collected periodically (for example, when a facility is stopped for maintenance), but since a frequency of collection can be reduced as compared with a case where nitric acid and sulfuric acid are collected in a state of being contained in water as in the conventional case, it is possible to reduce labor.

As described above, with the present invention, it is possible to easily treat water generated from an analysis target gas and collected in the closed container (closed drain pot).

BRIEF DESCRIPTION OF DRAWINGS

FIG. 1 is a schematic configuration diagram illustrating an embodiment of a gas analyzer according to the present invention.

FIG. 2 is a schematic configuration diagram illustrating a modification of a gas analyzer according to the present invention.

DESCRIPTION OF EMBODIMENTS

Figures 1, 2:
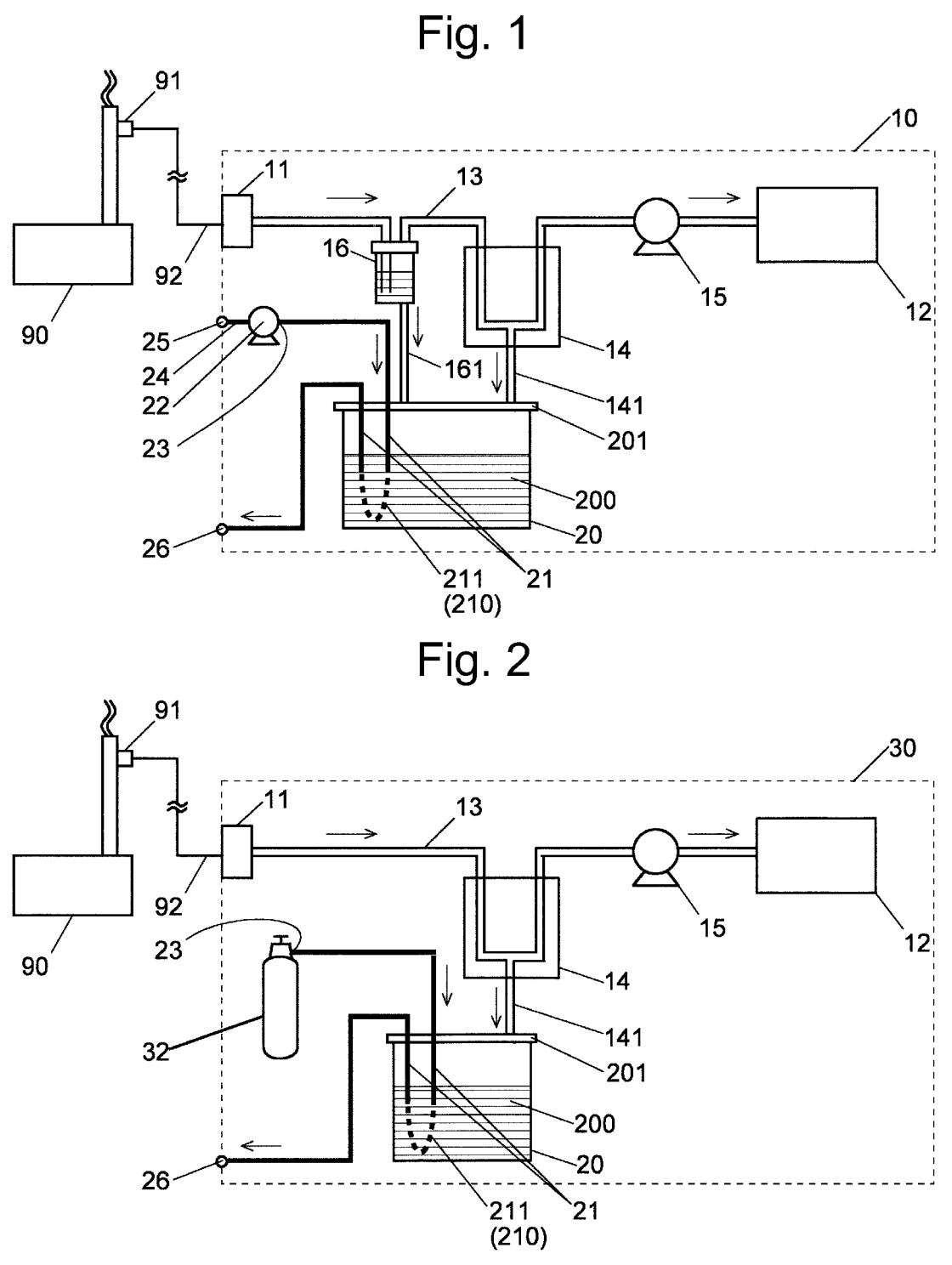
Figure 3:
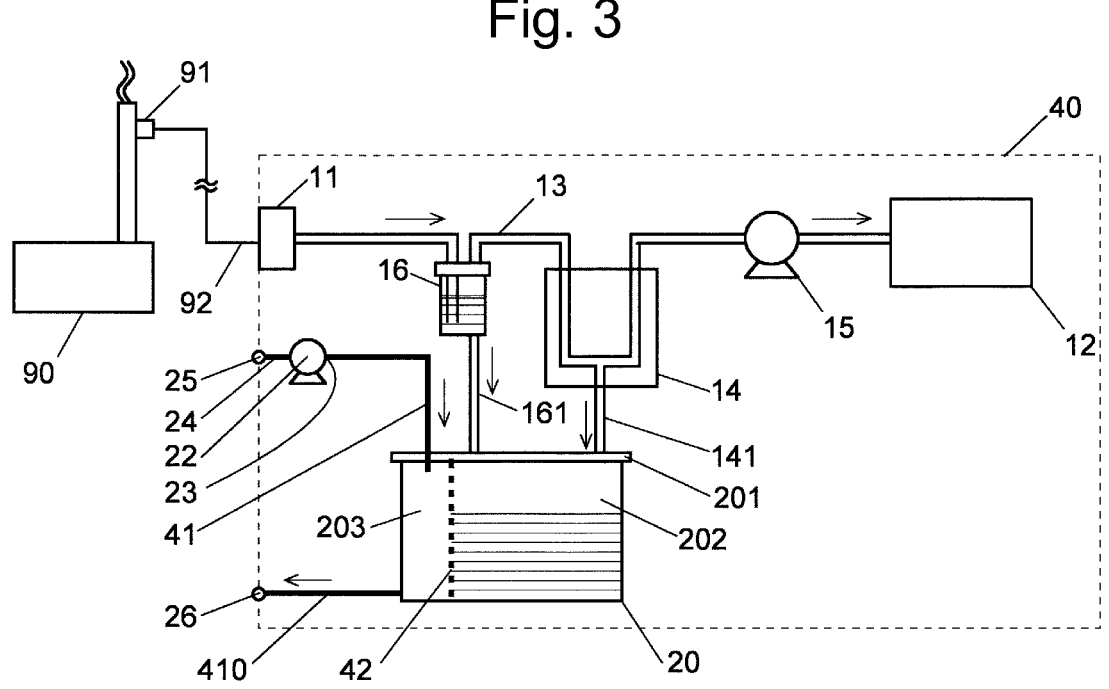
FIG. 3 is a schematic configuration diagram illustrating another modification of a gas analyzer according to the present invention.

Embodiments of a gas analyzer according to the present invention will be described with reference to FIGS. 1 to 3.

(1) Configuration of Gas Analyzer of Present Embodiment

A gas analyzer 10 of the present embodiment is used to measure the concentration of a predetermined substance (for example, nitrogen oxides, sulfur oxides, carbon monoxide, carbon dioxide, and oxygen) contained in an exhaust gas collected by a gas collection probe 91 attached to a gas discharge unit of an exhaust gas generation facility 90, such as a thermal power plant, a waste incineration plant, and a factory, and introduced through a pipeline 92.

The gas analyzer 10 includes a gas intake port 11 and a gas analysis unit 12, which are connected by an analysis target gas flow path 13. For the gas analysis unit 12, for example, a non-dispersive infrared (NDIR) spectrometer is used. In addition, an analysis target gas pump 15 is connected to the analysis target gas flow path 13.

When the analysis target gas containing water vapor is introduced into the analyzer after calibration of the analyzer, an amount of water vapor in the analyzer is different between the time of calibration and the time of measurement, and the reliability of the measurement result is lowered. Therefore, the gas analyzer 10 includes a cooling unit (cooler) 14 in the middle of the analysis target gas flow path 13 from the gas intake port 11 to the gas analysis unit 12. The analysis target gas is cooled to a predetermined temperature by the cooling unit 14 and then introduced into the gas analysis unit 12. Although one cooling unit 14 is provided in the present embodiment, an analysis target gas may be cooled in stages by arranging a plurality of cooling units.

In the cooling unit 14, a drain flow path 141 is connected to the analysis target gas flow path 13. The drain flow path 141 extends vertically downward. Liquid (drain) such as water generated by cooling of an analysis target gas in the cooling unit 14 is discharged to a closed container 20 described later through the drain flow path 141.

In addition, the gas analyzer 10 includes a drain separator 16 closer to the gas intake port 11 than the cooling unit 14 of the analysis target gas flow path 13 is. The drain separator 16 separates and collects drain generated in the analysis target gas flow path 13 at a preceding stage of the cooling unit 14 from the exhaust gas. The drain separator 16 is also provided with a drain flow path 161 extending vertically downward and reaching the closed container 20.

The closed container 20 is a closed drain pot and stores drain introduced from the cooling unit 14 and the drain separator 16 through the drain flow paths 141 and 161. A lid 201 is provided on an upper surface of the closed container 20, and the closed container 20 is closed by the lid 201 during use of the gas analyzer 10. At the time of maintenance of the gas analyzer 10, the lid 201 is removed, and removal of liquid remaining in the closed container 20 and cleaning of the inside of the closed container 20 can be performed as described later.

A tube 21 is accommodated in the closed container 20. Both ends of the tube 21 extend to the outside of the closed container 20. A part of the tube 21 disposed in the closed container 20 is a selective permeation member 211. The selective permeation member 211 is a tube which selectively let gas-phase water permeate, and for example, those described in Patent Literature 2 and Non Patent Literature 1 are used as the selective permeation member 211. The tubes described in these documents are made of a fluorine-based cation exchange resin having a cation exchange group, and have a characteristic in which only water can selectively permeate (nitric acid or sulfuric acid does not permeate) to a side with a lower partial pressure of water vapor between the inside and the outside of the tube. A portion of the tube 21 on both end sides of the selective permeation member 211 is made of rubber, plastic, or the like different from the material of the selective permeation member 211.

An exhaust port of a pump 22 (different from the analysis target gas pump 15) is connected to one end (first end 23) of the tube 21. One end of an intake pipe 24 is connected to the intake port side of the pump 22, and the other end of the intake pipe 24 is a gas introduction port 25 opened to the atmosphere. The pump 22 is a gas source which introduces an atmospheric air, which is a gas different from the analysis target gas, from one end of the tube 21 into the selective permeation member 211 in the tube 21. As described above, the inside of the selective permeation member 211 into which a gas is introduced from a gas source corresponds to a gas introduction space 210, and a space in the closed container 20 other than the tube 21 corresponds to a drain introduction space 200.

The other end (second end) of the tube 21 is a gas discharge port 26 opened to the atmosphere.

(2) Operation of Gas Analyzer of Present Embodiment

The operation of the gas analyzer 10 of the present embodiment will be described. In a state where the exhaust gas generation facility 90 is in operation, the gas intake port 11 is opened and the analysis target gas pump 15 is operated under the control of a control unit (not illustrated). As a result, the analysis target gas collected by the gas collection probe 91 is taken in from the gas intake port 11 through the pipeline 92, introduced into the gas analysis unit 12 through the analysis target gas flow path 13, and analyzed.

During the analysis, the analysis target gas is cooled by the cooling unit 14 provided in the middle of the analysis target gas flow path 13, and thus drain is generated. The drain is discharged to the drain introduction space 200 in the closed container 20 through the drain flow path 141. In addition, the drain separated from the analysis target gas by the drain separator 16 is also discharged to the drain introduction space 200 through the drain flow path 161. The drain contains water derived from water vapor contained in the exhaust gas having been liquefied and the components of nitric acid and sulfuric acid obtained by dissolving, in that water, nitrogen oxides and sulfur oxides having been contained in the exhaust gas.

During the analysis, the atmospheric air is continuously supplied from the gas introduction port 25 to the tube 21 by operating the pump (gas source) 22. When a storage amount of the drain discharged into the closed container 20 increases, the selective permeation member 211 disposed in the closed container 20 comes into contact with the drain. Then, since the water vapor partial pressure inside the selective permeation member 211 which is a part of the tube 21, that is, the gas introduction space 210 becomes lower than the water vapor partial pressure outside the selective permeation member 211, that is, the drain introduction space 200, the water contained in the drain selectively permeates from the outside to the inside of the selective permeation member 211, that is, from the drain introduction space 200 toward the gas introduction space 210 (components of nitric acid and sulfuric acid do not permeate).

The water that thus permeated through the gas introduction space 210 is taken into the atmospheric air passing through the tube 21 and discharged from the gas discharge port 26. Since the gas discharged from the gas discharge port 26 contains only the atmospheric air taken in from the gas introduction port 25 and water selectively collected from the drain, the gas can be released into the environment without any treatment.

By continuously supplying the atmospheric air from the pump 22 to the tube 21 in this manner, water is discharged from the closed container 20. Although liquid other than water, such as nitric acid and sulfuric acid, remains in the closed container 20, the amount of remaining liquid can be suppressed because water is discharged in this manner. As a result, a frequency of collection of the liquid in the closed container 20 can be reduced as compared with a case where the drain is collected in a state where the water is still contained, and thus the trouble can be reduced. Although a collection frequency depends on a capacity of the closed container 20, if, for example, a capacity for one cycle or more of a periodic inspection of the exhaust gas generation facility 90 is secured, it is not necessary to pay attention to an amount of drain in the closed container 20 except for the time of maintenance, so that the management can be remarkably simplified.

(3) Modifications

The present invention is not limited to the above embodiment, and various variations are possible. For example, in the above embodiment, the pump 22 is used as the gas source, but instead, as in a gas analyzer 30 illustrated in FIG. 2, a gas cylinder 32 may be used as the gas source. As a gas supplied from the gas cylinder 32, for example, dry air can be used. Alternatively, an inert gas such as nitrogen gas or argon gas may be used, or a gas other than the inert gas may be used. By introducing a dry gas such as dry air from the gas cylinder 32 into the tube 21, a partial pressure of water in the tube 21 can be lowered, so that the discharge of water vapor from the closed container 20 into the tube 21 can be prompted.

In addition, instead of the pump 22, a combination of a compressor and a filter regulator may be used. The filter regulator functions as a filter that removes dust or the like contained in the atmospheric air supplied from the compressor, and has a function of adjusting a pressure of the atmospheric air supplied to the tube 21.

Alternatively, instead of using the pump 22, the gas discharged from the gas analysis unit 12 may be introduced from the gas introduction port 25.

In the above embodiment, the drain separator 16 is provided in the analysis target gas flow path 13 in addition to the cooling unit 14, but, as in the gas analyzer 30 illustrated in FIG. 2, the drain separator 16 may be omitted. Note that although FIG. 2 illustrates an example in which the gas cylinder 32 is provided and the drain separator 16 is omitted, the pump 22 may be provided instead of the gas cylinder 32 to omit the drain separator 16, or the gas cylinder 32 and the drain separator 16 may be provided.

In addition, as in a gas analyzer 40 illustrated in FIG. 3, the inside of the closed container 20 may be partitioned into two spaces by a membrane (selective permeation member) 42 made of a material that selectively lets gas-phase water permeate, the drain flow path 141 (the drain flow path 161 in a case where the drain separator 16 is provided) may be connected to a drain introduction space 202 which is one space, and a gas flow path 41 from the gas source (the pump 22 in FIG. 3) may be connected to a gas introduction space 203 which is the other space. A gas discharge path 410 leading to the gas discharge port 26 is further connected to the gas introduction space 203. Also in this example, the gas cylinder 32 or the combination of the compressor and the filter regulator may be provided instead of the pump 22, or a gas discharged from the gas analysis unit 12 may be introduced into the gas introduction space 203. In addition, in this example, the drain separator 16 may be omitted.

With this configuration, by supplying a gas from the gas source (pump 22) to the gas introduction space 203 through the gas flow path 41 in a state where drain supplied from the drain flow paths 141 (and 161) is stored in the drain introduction space 202, only water in the drain selectively permeates the membrane 42 and enters the gas introduction space 203. The water that has entered the gas introduction space 203 is taken into the gas, and then discharged to the outside from the gas discharge port 26 via the gas discharge path 410.

Aspects

It will be understood by those skilled in the art that the exemplary embodiments described above are specific examples of the following aspects.
(Clause 1)
A gas analyzer according to clause 1 includes:
an analysis target gas flow path through which an analysis target gas flows;
a cooling unit which is provided in the analysis target gas flow path and configured to cool the analysis target gas;
a drain flow path through which liquid generated in the cooling unit is discharged;
a closed container connected to the drain flow path;
a selective permeation member which is a member partitioning the inside of the closed container into a drain introduction space connected to the drain flow path and a gas introduction space and configured to selectively let gas-phase water permeate from the drain introduction space to the gas introduction space;
a gas source configured to introduce a gas into the gas introduction space; and
a gas discharge port through which the gas in the gas introduction space is discharged.

With the gas analyzer according to clause 1, the inside of the closed container (closed drain pot) is divided into the drain introduction space connected to the drain flow path and the gas introduction space into which a gas is introduced by the gas source by the selective permeation member configured to selectively let gas-phase water permeate. When a gas (different from an analysis target gas) is introduced into the gas introduction space by a gas source, only water out of water containing nitric acid or sulfuric acid generated in a cooling unit and introduced into the drain introduction space of the closed container from a drain flow path permeates through the selective permeation member and enters the gas introduction space. The water that has entered the gas introduction space is taken into the gas and discharged to the outside from a gas discharge port. At that time, since the gas neither contains nitric acid nor sulfuric acid, there is no problem even if the gas is released into the environment without any treatment. Water is discharged from the closed container in this manner, and nitric acid and sulfuric acid are concentrated and stored in the drain introduction space of the closed container. Note that nitric acid and sulfuric acid in the drain introduction space need to be collected periodically (for example, when a facility is stopped for maintenance), but since a frequency of collection can be reduced as compared with a case where nitric acid and sulfuric acid are collected in a state of being contained in water as in the conventional case, it is possible to reduce labor. As described above, with the present invention, it is possible to easily treat water generated from an analysis target gas and collected in the closed container (closed drain pot).

(Clause 2)

A gas analyzer according to clause 2 is a gas analyzer according to clause 1, further including a tube having a first end and a second end disposed outside the closed container, wherein the selective permeation member is provided between the first end and the second end of the tube, and the gas source is connected to the first end of the tube.

With the gas analyzer according to clause 2, the selective permeation member can be easily configured using a commercially available tube, such as a tube made of a fluorine-based cation exchange resin having a cation exchange group described in Patent Literature 2 or Non Patent Literature 1.

(Clause 3)

A gas analyzer according to clause 3 is the gas analyzer according to clause 1 or 2, wherein the gas source is a pump configured to supply an atmospheric air to the gas introduction space.

With the gas analyzer according to clause 3, since the atmospheric air is used as the gas, it is not necessary to manage a remaining amount of the gas and the like as in a case of using a gas cylinder, and the management is facilitated.

(Clause 4)

A gas analyzer according to clause 4 is the gas analyzer according to clause 1 or 2, wherein the gas source is a gas cylinder configured to store a dry gas.

With the gas analyzer according to clause 4, the partial pressure of water in the tube is lowered by using the dry gas (for example, an air having a water vapor content lower than that of the atmospheric air, a nitrogen gas, or the like) as the gas, and the discharge of the water vapor from the closed container into the tube can be promoted.

(Clause 5)

A gas analyzer according to clause 5 is the gas analyzer according to any one of clauses 1 to 4, further including an analysis unit provided on a downstream side of the analysis target gas flow path and configured to analyze the analysis target gas, wherein the cooling unit is provided on an upstream side of the analysis unit in the analysis target gas flow path.

With the gas analyzer according to clause 5, the analysis unit can be protected from heat by providing the cooling unit on the upstream side of the analysis unit.

(Clause 6)

A drain treatment method according to clause 6 is a method for treating liquid generated by cooling an analysis target gas in a gas analyzer, the method including:

a collecting step of collecting the liquid in a closed container;

a water separation step of separating water from the liquid in the closed container without separating nitric acid and sulfuric acid; and a water discharging step of discharging the water to the outside of the closed container.

(Clause 7)

A drain treatment method according to clause 7 is the drain treatment method according to clause 6, wherein, in the water separation step, water is separated from the liquid by a selective permeation member made of a material that selectively lets gas-phase water permeate.

(Clause 8)

A drain treatment method according to clause 8 is the drain treatment method according to clause 7, wherein, in the water separation step, a gas is introduced into a tube having the selective permeation member.

With the drain treatment methods according to clauses 6 to 8, water generated from the analysis target gas and collected in the closed container can be easily treated.

REFERENCE SIGNS LIST

10, 30, 40 . . . Gas Analyzer
11 . . . Gas Intake Port
12 . . . Gas Analysis Unit
13 . . . Analysis Target Gas Flow Path
14 . . . Cooling Unit
141, 161 . . . Drain Flow Path
15 . . . Analysis Target Gas Pump
16 . . . Drain Separator
20 . . . Closed Container
200 . . . Drain Introduction Space
201 . . . Lid
202 . . . Storage Space
203 . . . Gas Introduction Space
21 . . . Tube
210 . . . Gas Introduction Space
211 . . . Selective Permeation Member
22 . . . Pump
23 . . . First End
24 . . . Intake Pipe
25 . . . Gas Introduction Port
26 . . . Gas Discharge Port (Second End)
32 . . . Gas Cylinder
41 . . . Gas Flow Path
410 . . . Gas Discharge Path
42 . . . Membrane (Selective Permeation Member)
90 . . . Exhaust Gas Generation Facility
91 . . . Gas Collection Probe
92 . . . Pipeline

The invention claimed is:

1. A gas analyzer comprising:

an analysis target gas flow path through which an analysis target gas flows;

a cooling unit which is provided in the analysis target gas flow path and configured to cool the analysis target gas;

a drain flow path through which liquid generated in the cooling unit is discharged;

a closed container connected to the drain flow path;

a selective permeation member which is a member partitioning an inside of the closed container into a drain introduction space connected to the drain flow path and a gas introduction space and configured to selectively let gas-phase water permeate from the drain introduction space to the gas introduction space;

a gas source configured to introduce a gas into the gas introduction space; and a gas discharge port through which the gas in the gas introduction space is discharged.

2. The gas analyzer according to claim 1, further comprising a tube having a first end and a second end disposed outside the closed container, wherein the selective permeation member constitutes a portion of the tube located between the first end and the second end, and the gas source is connected to the first end of the tube.

3. The gas analyzer according to claim 1, wherein the gas source is a gas cylinder configured to store a dry gas.

4. The gas analyzer according to claim 1, wherein the gas source is a pump configured to supply an atmospheric air to the gas introduction space.

5. The gas analyzer according to claim 1, further comprising an analysis unit provided on a downstream side of the analysis target gas flow path and configured to analyze the analysis target gas, wherein the cooling unit is provided on an upstream side of the analysis unit in the analysis target gas flow path.

6. A drain treatment method for treating liquid generated by cooling an analysis target gas in a gas analyzer, the method comprising:

a collecting step of collecting the liquid in a closed container;

a water separation step of separating water from the liquid in the closed container without separating nitric acid and sulfuric acid; and a water discharging step of discharging the water to an outside of the closed container.

7. The drain treatment method according to claim 6, wherein, in the water separation step, water is separated from the liquid by a selective permeation member made of a material that selectively lets gas-phase water permeate.

8. The drain treatment method according to claim 7, wherein, in the water separation step, a gas is introduced into a tube having the selective permeation member.

* * * * *